2 Sheets--Sheet 1.

W. Y. WARNER.

Machines for Removing Snow and Ice from Railways.

No. 5,838. Reissued April 14, 1874.

WITNESSES
Eugene P. Cadson
J. B. Connolly

By

INVENTOR
William Y. Warner
Connolly Bros

Attorneys.

2 Sheets--Sheet 2.

W. Y. WARNER.

Machines for Removing Snow and Ice from Railways.

No. 5,838. Reissued April 14, 1874.

WITNESSES.
Eugene L. Cadman
J. B. Connolly.

By

INVENTOR.
William Y. Warner
Connolly Bros
Attorneys.

UNITED STATES PATENT OFFICE.

WILLIAM Y. WARNER, OF WILMINGTON, DELAWARE.

IMPROVEMENT IN MACHINES FOR REMOVING SNOW AND ICE FROM ROADWAYS.

Specification forming part of Letters Patent No. 78,161, dated May 19, 1868; reissue No. 5,838, dated April 14, 1874; application filed November 19, 1873.

*To all whom it may concern:*

Be it known that I, WILLIAM Y. WARNER, of Wilmington, New Castle county, Delaware, have invented a Machine or Apparatus for Removing Snow and Ice from Streets and Railways; and I do hereby declare the following to be a full, clear, and exact description of the same, reference being had to the accompanying drawings forming part of this specification, in which—

Figure 1:
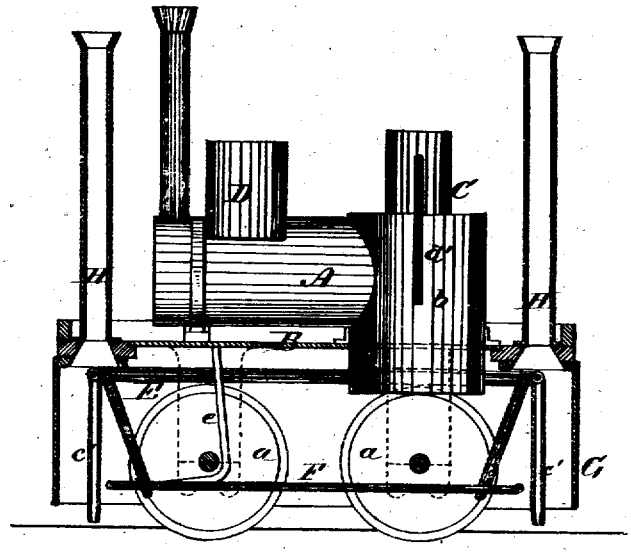
Figure 2:
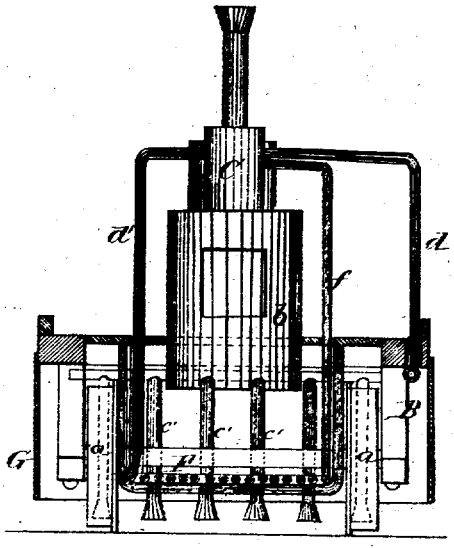
Figure 3:
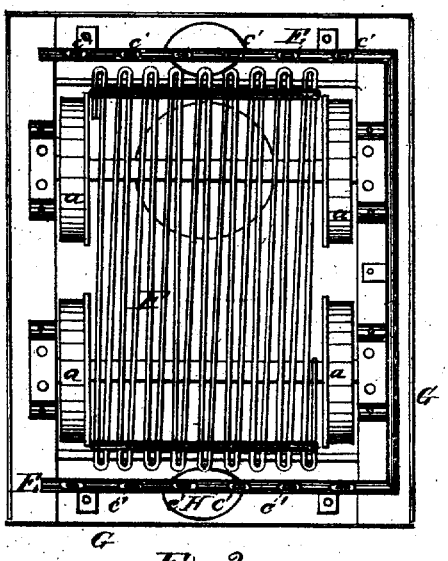

Figure 1 is a sectional elevation; Fig. 2, a transverse section of the same on the line *x x*, Fig. 1; and Fig. 3 is an inverted plan view.

My invention has for its object to provide an improved means for cleaning the streets of cities and towns, and railways, of snow and ice. This invention has relation to portable snow-melting apparatus specially adapted to use on roadways and streets; and it consists in the novel construction and combination of parts, as hereinafter described, having particular reference to the employment of a distributer or distributers located between or substantially beyond the traction-lines of the vehicle, so that the snow lying on the surface will be melted by the currents forcibly projected downward from said distributer or distributers; also, to the combination, with said distributer or distributers, of suitably-arranged heat-radiating apparatus; also, to the combination, with a distributer or distributers and heat-radiator, of a steam-boiler, furnace, steam-drum, water-reservoir, apron, and exhaust-flues.

The minor features of the invention are fully set forth in the following detailed description, and embodied in the claims.

In the accompanying drawings the apparatus is mounted upon a car or truck, B, supported by wheels *a a*. A steam-boiler, A, rests upon, and is secured to, the platform of the car, its fire-box *b* passing through an opening in the latter, as shown in Fig. 1. Directly over the fire-box is a steam-drum, C, and near the front portion of the boiler a water-tank, D. To the under side of the platform of the car B, and extending around three sides of the same, as shown in the inverted plan view, is secured a steam-pipe, E, and projecting downwardly from the latter are smaller pipes or jets *c'*, open at their lower ends. The pipe E is supplied with steam by a tube, *d*, leading from the steam-drum, and from the opposite side of the latter passes a similar tube, *d'*, which supplies steam to one end of a pipe or series of pipes, F, running in a zigzag direction beneath the car, and supported by braces *e* at a point as close to the track as they can with safety be placed. The opposite end of the pipe F communicates with the water-tank D by means of a tube, *f*, as shown in Fig. 2, for a purpose described hereafter. The pipes below the platform and the wheels of the car are inclosed in a sheet-metal casing, G, secured to the sides and ends of the platform; and communicating with the chamber thus formed beneath the car, and projecting upwardly from the platform, are two flues, H.

Before starting the car, steam is admitted into the pipes E and F through the supply-tubes *d* and *d'*, each of which is provided with suitable valves. From the pipe E the steam passes into the jets *c'* and is discharged from the lower ends of each of the latter on the snow or ice beneath. The steam also traverses in a zigzag course the whole length of the pipe F, in which course it becomes more or less condensed, and is finally discharged through the pipe *f* into the water-tank D, serving to heat the water in the latter, so that new steam may be made more rapidly. After thus admitting steam to the several pipes, the car is moved slowly over the street or track, the snow or ice thereon being effectually melted by the jets of steam discharged from the pipes *c'*, and by the heat radiated from the pipe or pipes F.

The discharged steam, if permitted to escape from beneath and around the car, would interfere with the duties of the attendants, and be apt to frighten horses; it is therefore confined by the casing G and caused to pass out above the car by the flues H H.

The above-described apparatus may be used either in connection with a snow-plow or not. When employed for clearing streets the plow would probably be dispensed with, and the snow and ice melted in position as found, and without other disturbance. By this means the entire surface of a street may be speedily and thoroughly cleared of snow, which, being melted, will flow off in the form of water, which will be found much more desirable and convenient than piling the snow up in heaps on either side, as is done by devices of construction different from this.

What I claim as my invention is—

1. A machine for melting snow and ice from the surface of roadways, comprising a steam-generator, furnace, steam-ejector, and heat-radiator, combined substantially as and for the purpose specified.

2. In an apparatus for melting snow or ice upon roadways, a distributer or distributers, constructed so that the currents discharged therefrom will be forcibly projected downward and between or beyond the traction-lines *a a* of the apparatus, substantially as and for the purpose specified.

3. An apparatus, consisting of a boiler, A, fire-box *b*, steam-drum C, water-reservoir D, and steam-ejector E, all combined, and mounted on a truck, to melt snow or ice upon the surface of roadways, substantially as set forth.

4. In combination with the truck B, steam-pipes E, provided with jets *c'*, said pipes E being placed across the truck so as to project the steam against the snow or ice between the wheels on opposite sides of the vehicle, or between the rails of the track, substantially as and for the purpose set forth.

5. The combination of the steam-pipes E E, having escape-orifices *c' c'*, and the radiating pipes F F, with the truck B, combined with a steam-generator, substantially as described.

6. In combination with the casing G the flues H H, as and for the purpose specified.

In testimony that I claim the foregoing I have hereto set my hand this 10th day of November, A. D. 1873.

WILLIAM Y. WARNER.

Witnesses:

JNO. M. SCOTT,

J. WINFIELD SCOTT.